(12) United States Patent
Mair et al.

(10) Patent No.: US 9,115,746 B2
(45) Date of Patent: Aug. 25, 2015

(54) SCREW AND THIN METAL SHEET CONNECTION PRODUCED THEREWITH

(71) Applicant: SFS intec Holding Ag, Heerbrugg (CH)

(72) Inventors: Roland Mair, Gotzis (AT); Rene Dutler, Eichberg (CH)

(73) Assignee: SFS intec Holding AG, Heerbrugg (CH)

(*) Notice: Subject to any disclaimer, the term of this patent is extended or adjusted under 35 U.S.C. 154(b) by 0 days.

(21) Appl. No.: 14/361,123

(22) PCT Filed: Feb. 6, 2013

(86) PCT No.: PCT/EP2013/052256
§ 371 (c)(1),
(2) Date: May 28, 2014

(87) PCT Pub. No.: WO2013/120738
PCT Pub. Date: Aug. 22, 2013

(65) Prior Publication Data
US 2014/0321943 A1     Oct. 30, 2014

(30) Foreign Application Priority Data
Feb. 17, 2012   (DE) .......................... 10 2012 101 320

(51) Int. Cl.
F16B 35/04         (2006.01)
F16B 43/00         (2006.01)
(Continued)

(52) U.S. Cl.
CPC ............ F16B 43/001 (2013.01); F16B 5/0275 (2013.01); F16B 25/0031 (2013.01); F16B 25/0063 (2013.01); F16B 25/0073 (2013.01); F16B 25/103 (2013.01)

(58) Field of Classification Search
USPC .............. 411/386, 387.1, 411, 413, 415, 424, 411/426, 542
See application file for complete search history.

(56) References Cited

U.S. PATENT DOCUMENTS 2,292,557 A      8/1942   Wilson
4,621,963 A *   11/1986   Reinwall ........................ 411/369
(Continued)

FOREIGN PATENT DOCUMENTS

DE    295 02 068 U1    6/1996
DE    19651838         6/1997
(Continued)

Primary Examiner — Roberta Delisle
(74) Attorney, Agent, or Firm — Volpe and Koenig, P.C.

(57) ABSTRACT

A screw (10) and a connection produced therewith of a thin metal sheet forming a substructure (40) to a plastics component (30) having a through-bore (32) and having a seal (50) located between the substructure (40) and the component (30). The screw (10) has a shank (13) having a thread-cutting thread (16) and a tip (12) in the form of a boring part, and also a lower thread section (18) having a first thread outside diameter (D18) and an upper thread section (19) having a second, larger thread outside diameter (D19) and having a conically narrowing transition section (22) between the two thread sections (18, 19). The upper thread section (19) has a thread pitch (P2) which is smaller than the thread pitch (P1) of the lower thread section (18). During the production of the connection, the upper thread is screwed into the through-bore (32), wherein a form-fit is produced in the component (30) between the latter and the screw (10) and the material of the component (30) rests in a sealing manner around the upper thread section (19). This produces a combination of a seal without a sealing washer and with a defined distance between the component and the substructure by defined compression of the seal (50).

24 Claims, 3 Drawing Sheets

(51) Int. Cl.
*F16B 5/02* (2006.01)
*F16B 25/00* (2006.01)
*F16B 25/10* (2006.01)

(56) References Cited

U.S. PATENT DOCUMENTS

| | | | |
|---|---|---|---|
| 4,878,793 A * | 11/1989 | Hewison | 411/387.2 |
| 4,959,938 A * | 10/1990 | De Caro | 52/410 |
| 5,259,398 A * | 11/1993 | Vrespa | 128/898 |
| 8,419,332 B2 * | 4/2013 | Kochheiser | 411/412 |
| 8,616,816 B2 * | 12/2013 | Pieciak et al. | 411/411 |
| 2002/0018700 A1 * | 2/2002 | Shinjo | 411/413 |
| 2002/0110439 A1 * | 8/2002 | Craven | 411/413 |
| 2007/0128001 A1 * | 6/2007 | Su | 411/413 |

FOREIGN PATENT DOCUMENTS

| | | |
|---|---|---|
| DE | 29607265 | 6/1997 |
| DE | 20121563 | 1/2003 |
| DE | 102006041860 | 3/2008 |
| DE | 102008045412 | 3/2010 |
| WO | 98/42989 A1 | 10/1998 |
| WO | 9915796 | 4/1999 |
| WO | 0142669 | 6/2001 |
| WO | 0240803 | 5/2002 |

* cited by examiner

SCREW AND THIN METAL SHEET CONNECTION PRODUCED THEREWITH

BACKGROUND

The invention relates to a connection of a thin metal sheet, forming a substructure, by a screw to a plastics component having a through-bore and having a seal located between the substructure and the component, wherein the connection is produced with a screw having a shank with a thread-cutting or self-tapping thread and with a tip.

A screw of the abovementioned type is known from the document DE 10 2008 045 412 A1. This document also discloses a connection which corresponds essentially to the abovementioned connection. However, in the case of the known connection, a conical sealing disk is arranged between the screw head and the component, and the upper thread section is additionally coated with a sealing means. A sealing profile is located between the component and the substructure.

The known screw connects a profile, which is a threshold, a door frame part or window frame part, to an outer wall in an opening in a building. The upper thread section of the screw is coated with the sealing means. The sealing disk rests in a sealing manner on the profile. The sealing means fills and seals off any space between the support thread and an internal thread of the bore in the profile. The upper thread section serves as a support thread. The thread engagement between the support thread and the profile prevents a relative movement between the profile and the screw. Sealing is achievable between this screw and the profile only because both are precisely coordinated with one another. Such sealing would not be readily achievable if the screw were to be used to fasten photovoltaic elements to trapezoidal sheet metal on a roof. The upper thread section having a larger thread outside diameter would tend to be disruptive in this case. Furthermore, a conical sealing disk would only be usable when the screw has a head, this not necessarily always being the case, and use is usually made, between the trapezoidal sheet metal and the photovoltaic elements, of holding elements, frequently made of plastics material, in the region of which sealing would in any case only be achievable with difficulty. If screws without a head are used, the problem otherwise arises that the lower thread section can be stripped in the trapezoidal sheet metal.

A screw having a shank and a head for fastening a component to a substructure with a conical sealing disk being pressed tightly against the component is already known from the document DE 10 2006 041 860 A1. In this case, the screw head is configured as a cone on its underside about the shank. The cone angle of the conical sealing disk is equal to or greater than the cone angle of the screw head. On account of the conical configuration of the underside of the screw head, what is known as "dishing" of the sealing disk when the screw is tightened is avoided. Such screws are preferably used for mounting steel profile panels for roof, wall and ceiling constructions. The sealing disks usually consist of a metal rear, on which an elastomer layer made of EPDM is vulcanized in an inseparable manner. For thin metal sheet connections, as are intended to be produced in the case of trapezoidal sheet metal, such a screw is less suitable on account of the high force with which it has to be tightened. The risk that the thread will be stripped in the trapezoidal sheet metal would be too high.

The document WO 02/40803 A1 discloses a device and a method for fastening a roof sealing web. Together with the screw, use is made of a holding element, into which an upper thread section is screwed. The screw has a lower thread section having a smaller diameter, which is screwed into a roof substructure. The connection produced in this way is complicated because a specifically designed holding element is required. In order to achieve complete sealing, after the screw has been set, a liquid film is poured into a recess between the holding element and the screw head. Therefore, such a screw connection is likewise less suitable for use in the photovoltaic field.

The document EP 1 015 774 B1 discloses the fastening of wooden battens to a roof or wall substructure consisting inter alia of wood. The screw used in this fastening has on its shank in each case a thread section adjoining the boring tip and the head. These two thread sections have the same outside diameter. In order that wooden battens can be fastened to a roof or wall substructure consisting of wood in a manner resting thereon in a firmly pressed manner, the thread section adjoining the head has a thread pitch which is smaller than the thread pitch of the thread section adjoining the boring tip. The head of the screw is small and formed in a countersinkable manner. Sealing considerations play no part in this connection. There is mutual firm pressing between the batten and the substructure, as a result of which relatively small changes in size, dependent on air humidity, in the region of the batten and likewise in the region of the substructure can be supported.

The document DE 201 21 563 U1 discloses a screw for fastening a formwork panel to a metal formwork girder, having a shank provided with a thread, which is intended to pass through the formwork panel and to come into thread engagement with the formwork girder, wherein the screw is provided with a boring part, an expendable device is provided in the region of the boring part for widening a bore produced in the formwork panel by the boring part, and the shank provided with a thread has a tool engagement end for a screwing-in tool and, next to the tool engagement end, a thread part which has a larger diameter than the remaining thread part. The thread part having a larger diameter has a smaller pitch than the remaining thread part. When a formwork panel is fastened, a connection is produced, in which sealing between the screw and the formwork panel does not matter. This known screw is also only usable when, as in the present case, a substructure provides sufficient resistance in order to shear off the boring wings of which the expendable device consists. Therefore, the known screw would be suitable only to a limited extent to produce a thin metal sheet connection.

The document DE 295 02 068 U1 shows a screw for connecting a window frame, consisting of plastics material, to a cuboidal steel profile. The screw has an upper thread section and a lower thread section, wherein a conically narrowing transition section of the screw shank is arranged between the upper and the lower thread section. The screw is used in a plastics window frame in which a steel profile is used for reinforcement.

SUMMARY

It is the object of the invention to develop a connection of the type mentioned at the beginning such that stripping prevention of the screw in the connection is ensured and complete sealing of such a connection can be achieved in a simpler manner.

Proceeding from a connection of the type mentioned at the beginning, this object is achieved according to the invention in that the substructure is formed from a thin metal sheet, in that the component is produced from plastics material, in that the tip is configured as a boring part and/or as a penetration tip, having a lower thread section, adjacent to the tip, with a first thread outside diameter, having an upper thread section, opposite the tip, with a second, larger thread outside diameter, and having a transition section with a gradually changing diameter between the two thread sections, wherein the upper thread section has a thread pitch which is smaller than the thread pitch of the lower thread section, wherein the connection is produced as a tight connection by a combination of sealing by defined compression of the seal and sealing by way of a form fit between the upper thread section of the screw and the component and compaction of the material of the component around the upper thread section.

By way of the connection according to the invention, sealing is achieved without sealing means or a sealing disk between the screw and the component by the production of a form fit with the aid of the thread sections having different thread pitches, without a sealing disk and/or a sealing means being introduced between the screw and the component. When the upper thread section of the screw according to the invention is screwed into a bore that is provided, for example into a core hole provided in a component by the setting of the screw itself, a form fit occurs because subsequently the material of the component rests in a sealing manner around the thread of the upper thread section. The double thread with different pitches in the case of the screw according to the invention allows exact compression of the seal located between the substructure and the component. Specifically, since the thread pitches are designed such that the pitch of the upper thread section is smaller than the pitch of the lower thread section, when the screw is set, the upper component is pulled against the substructure. The seal located therebetween is compressed in a defined manner as a result. In combination with the form fit between the upper thread section of the screw and the compacted material of the component, said compacted material thus being located in a sealing manner around the thread of the upper thread section, this defined compression results in the seal according to the invention, without sealing means or a sealing disk between the screw and the component. When photovoltaic elements are fastened to trapezoidal sheet metal, a seal adhesively bonded to the trapezoidal sheet metal is intended to be compressed in a defined manner. This is because the connection is exposed to the weather and has to be watertight. This tightness is achieved by the use of the screw in the connection according to the invention. If a connection according to the invention is produced without a seal between the component and the substructure, sealing between the screw and the component is present in any case on account of the form fit between the thread of the upper thread section and the compaction, achieved about this thread section on account of the smaller thread pitch thereof, of the material of the component.

Advantageous refinements of the connection according to the invention form the subjects of the dependent claims.

In one refinement of the connection according to the invention, the compression of the seal corresponds to the difference between the thread pitches of the two thread sections multiplied by the number of thread turns of the thread of the upper thread section. Defined compression of the seal can be achieved in a simple manner by the selection of a particular difference.

In a further refinement of the connection according to the invention, the seal is compressed by between 20% and 80%. This ensures reliable sealing between the component and substructure and also around the screw shank between the component and the substructure.

In a further refinement of the connection according to the invention, the diameter of the through-bore in the component corresponds at least to the core diameter of the thread of the lower thread section or of the upper thread section of the screw. Reliable molding of the thread of the upper thread section into the material of the component is achieved by the selection of one or the other core diameter.

In a further refinement of the connection according to the invention, the thread outside diameter of the upper thread section is coordinated with the material properties of the component by way of the thread outside diameter of the lower thread section. If a thread is pre-cut in a through-bore by way of the thread of the lower thread section, the thread of the upper thread section subsequently has to be capable of overcutting this thread in order to compact material of the component in a sealing manner around the upper thread section. The thread outside diameters of the two thread sections can be coordinated with one another for example taking into consideration the hardness of the material of the component.

In a further refinement of the connection according to the invention, the thread form of the upper thread section is coordinated with the material properties of the component. Here, too, for example a property such as the hardness of the material of the component can advantageously be taken into consideration and utilized.

In a further refinement of the connection according to the invention, the component is configured as a glass fiber reinforced plastics part. The glass fiber reinforcement ensures that the different configurations of the lower and upper thread section can be utilized in a particularly advantageous manner.

In a further refinement of the connection according to the invention, the seal is attached to the component on a bearing surface with respect to the substructure and around the through-bore. As a result, reliable sealing is additionally ensured.

In a further refinement of the connection according to the invention, the seal is connected in a sealing manner to the component on one side and to the substructure on the other. In this way, complete sealing between the component and substructure is ensured even more reliably.

In a further refinement of the connection according to the invention, the connection is used on an outer shell of a building. In this refinement, the connection according to the invention can be used particularly advantageously since it is usually difficult to reliably seal off connections on an outer shell.

In a further refinement of the connection according to the invention, the connection is used on a roof of a building. For this refinement, the same applies as for the above-described refinement.

In a further refinement of the connection according to the invention, the core diameter, the through-bore in the region of the upper thread section, and the thread form of the upper thread section are designed such that a volume displaced by the thread of the upper thread section is pushed into, and thus seals off, the region of a volume between the core diameter of the upper thread section and the through-bore. Particularly reliable sealing of the upper thread section in the component is ensured in a reliable and repeatable manner by the selection of the abovementioned parameters.

In a further refinement of the connection according to the invention, the transition section is configured with a thread start of the upper thread section. Thus, a transition which, while being stepped, is continuous is provided between the lower thread section and the upper thread section, said transition making it easier to set the screw when, instead of a bore, only a core hole, produced by the boring part of the screw, is available in a component to be fastened in order to receive that part of the shank that is provided with the upper thread section.

In a further refinement of the connection according to the invention, the transition section is configured without a thread. This refinement of the screw is suitable for fastening a component which is provided with a through-bore for receiving the screw, wherein the through-bore expediently has a diameter which corresponds to the outside diameter of the lower thread section or is somewhat smaller than the outside diameter.

In a further refinement of the connection according to the invention, a part of the shank that adjoins the transition section in the direction of the tip is configured in a manner without a thread. As a result of the choice of the length of this shank section without a thread, it is possible to ensure that, with the screw set, the upper thread section is in thread engagement only with the component to be fastened and the lower thread section is in thread engagement only with a substructure, for example trapezoidal sheet metal, and optionally a seal located on the substructure.

In a further refinement of the connection according to the invention, the thread pitch of the lower thread section is in a ratio of 1.1-1.5 to the thread pitch of the upper thread section. This ensures, with the screw set, the desired pressing of the component against a substructure and the sealing molding of the upper thread section into the component.

In a further refinement of the connection according to the invention, elements for widening a core hole bored with the tip and/or for heating a material surrounding the core hole are provided in the transition section. This refinement of the connection makes it easier both to set the screw and also to achieve sealing molding of the shank section having the upper thread section in the component to be fastened.

In a further refinement of the connection according to the invention, the shank is provided with a head and/or a tool engagement portion at an end opposite the tip. The head makes it easier to prevent stripping of the screw. The tool engagement portion makes it easier to set the screw.

In a further refinement of the connection according to the invention, the head is configured with a flat disk. The disk acts as a flange on the head of the screw and serves as an abutment for the upper thread section. This ensures even more reliably that the lower thread section cannot be stripped, since the disk of the head butts against the component before a component to be screwed to a substructure comes fully into abutment and the thread of the lower thread section could be stripped. Non-stripping setting of the screw is thus ensured in an even better manner.

In a further refinement of the connection according to the invention, the thread of the lower thread section is a sheet-metal screw thread. This refinement is expedient when the substructure to which a component is to be fastened is for example trapezoidal sheet metal.

In a further refinement of the connection according to the invention, the thread outside diameters of the upper and lower thread sections are in a ratio of 1.2 to 1.4. This ensures that the screw can also be set reliably and the desired sealing can be achieved when, rather than a through-bore, the diameter of which corresponds to the outside diameter of the lower thread section, only a core hole that is produced by the boring part is provided in a component to be fastened.

In a further refinement of the connection according to the invention, the thread sections have core diameters which are in a ratio of 1.6 to 1.8 and preferably 1.8. As a result, it is much easier to achieve secure fastening of a component to a substructure and reliable sealing between the screw and the component and between the component and the substructure.

BRIEF DESCRIPTION OF THE DRAWINGS

Exemplary embodiments of the invention are described in more detail in the following text with reference to the drawings, in which.

DETAILED DESCRIPTION OF THE PREFERRED EMBODIMENTS

Figures 1A, 1B, 1C:
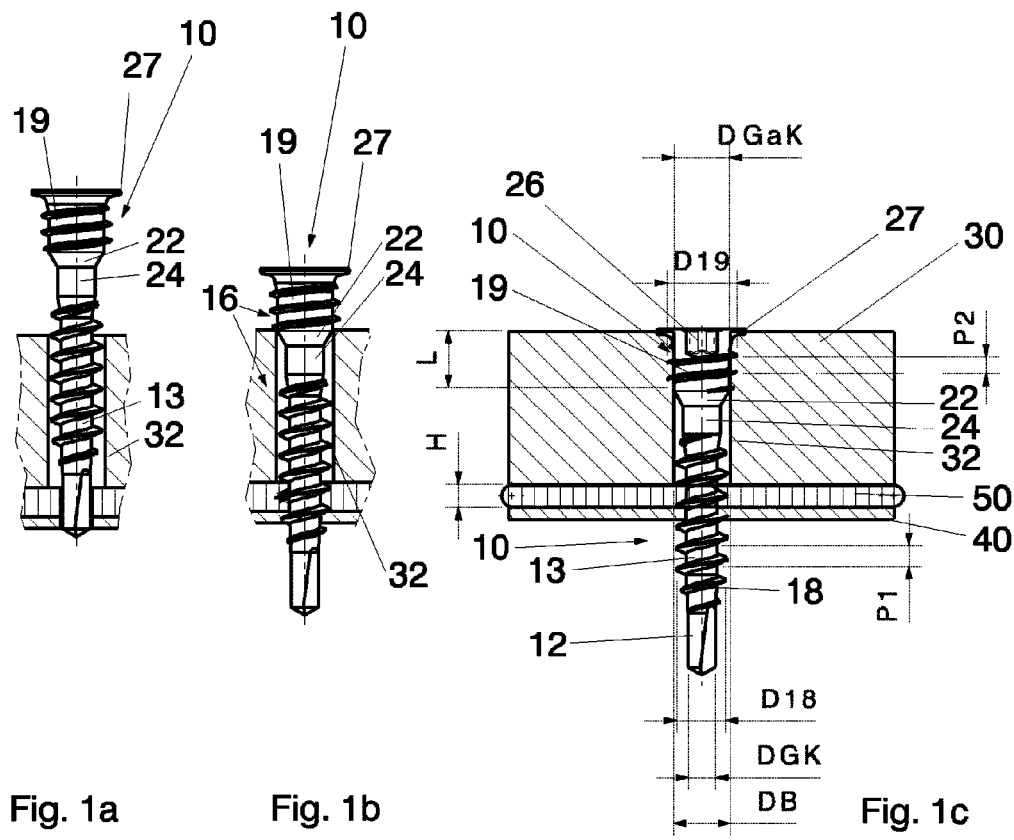
FIGS. 1A-1C show a first embodiment of a connection according to the invention during different phases in the production of the first embodiment of the connection according to the invention of a component to a substructure.

FIGS. 1A-1C show a first embodiment of the connection according to the invention having a screw, which is designated 10 overall, in three phases in the production of the first embodiment of the connection according to the invention of a component 30 to a substructure 40. The screw 10 serves for fastening the component 30 to the substructure 40. The component 30 may be a plastics part, which is a component part of a photovoltaic element which is intended to be fastened to a roof, which is represented here by the substructure 40. The component 30 is a glass fiber reinforced plastics part in the exemplary embodiments described here.

The substructure 40 may be a thin metal sheet, for example a trapezoidal metal sheet. A seal 50 is adhesively bonded to the substructure 40. When the screw 10 is tightened, the seal 50 is intended to be compressed in a defined manner to a thickness H in order to ensure sealing between the component 30 and the substructure 40. In addition, the screw 10 is intended to be sealed in the component 30, this being described in more detail in the following text. Furthermore, the setting of the screw 10 is intended to take place in a non-stripping manner, this likewise being described in more detail in the following text.

Finally, the connection according to the invention having the screw 10 (or 10', 10") can be produced by a combination of sealing without a sealing means or sealing disk between the screw 10 (or 10', 10") and the component 30 and defined compression of the seal, this likewise being described in more detail in the following text.

Figures 2A, 2B, 2C:
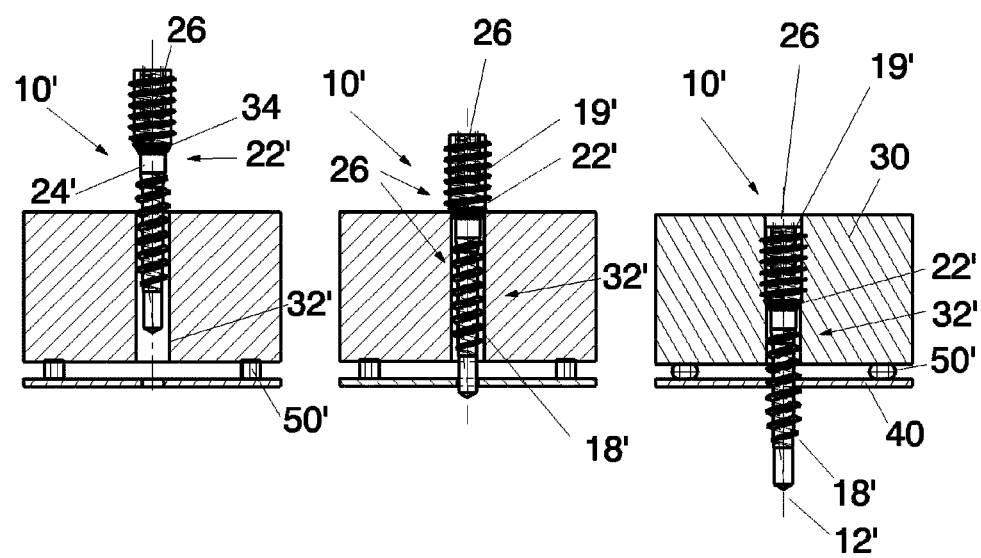
FIGS. 2A-2C show a second embodiment of a connection according to the invention during different phases in the production of the second embodiment of the connection according to the invention of a component to a substructure.

The component 30 has a through-bore 32 having a diameter $D_B$. According to the illustration in FIGS. 1A-1C and 3A-3C, the screw 10 has a shank 13 having a thread-cutting or self-tapping thread 16 and a tip 12 configured as a boring part. Rather than being configured as a boring part, the tip 12 can also be configured as a penetration tip 12', which is shown in FIGS. 2a-2c, which will be dealt with in more detail below. The thread 16 comprises a lower thread section 18 adjacent to the tip 12 and an upper thread section 19 opposite the tip 12. The thread of the lower thread section 18 is a sheet-metal screw thread. The lower thread section 18 has a core diameter $D_{GK}$. The upper thread section 19 has a core diameter $D_{GaK}$ and a length L. The lower thread section 18 has a thread outside diameter $D_{18}$. The upper thread section 19 has a thread outside diameter $D_{19}$, which is larger than the thread outside diameter $D_{18}$. Located between the two thread sections 18, 19 is a transition section 22 having a gradually changing diameter, which is embodied here as a conically narrowing shank section. The in this case conically narrowing transition section 22 may be a shank section without a thread, as is illustrated in FIGS. 1a and c. Instead of this, the in this case conically narrowing transition section 22 can be configured with a thread start of the upper thread section 19, as is the case in the second embodiment of the screw of the connection according to the invention, which is shown in FIGS. 2a-2c.

The transition section 22, 22', 22" does not have to be formed in a conically narrowing manner. It is sufficient for the transition section 22, 22', 22" to be formed by a chamfer of a cylindrical part, facing the tip 12, 12', of the upper thread section 19, 19', 19". Such a chamfer, which is understood to be the breaking of an edge, can be formed by a radius or a bevel.

Furthermore, in the screw 10, a part section of the shank 13, said part section adjoining the transition section 22 in the direction of the tip 12, is configured as a $P_2$ which is smaller than a thread pitch $P_1$ of the lower thread section 18. The thread pitch $P_1$ of the lower thread section 18 is in a ratio of 1.1 to 1.5 to the thread pitch $P_2$ of the upper thread section.

The compression of the seal 50, 50' corresponds to the difference between the thread pitches of the two thread sections 18, 19; 18', 19' multiplied by the number of thread turns of the thread of the upper thread section 19, 19'. Expediently, the seal 50, 50' will be compressed by between 20% and 80%.

According to the illustration in FIGS. 2A-2C and 3A-3C, elements 34 for widening a through-bore 32', 32" and/or for heating a material surrounding the through-bore 32', 32" are present on the in this case also conically narrowing transition section 22', 22". The elements 34 may be configured for example as milling ribs.

The diameter of the through-bore 32, 32', 32" should be in a range between the core diameter $D_{GK}$ of the lower thread section 18, 18', 18" and the core diameter $D_{GaK}$ of the upper thread section 19, 19', 19". The diameter $D_B$ of the through-bore 32, 32', 32" can be equal to the thread outside diameter $D_{18}$ of the lower thread section 18, 18', 18". In particular when the screw, as in FIGS. 2a-2c, has a penetration tip 12' rather than a boring part as the tip, the diameter of the through-bore 32' should be somewhat smaller than the thread outside diameter $D_{18}$ of the lower thread section 18', in order to ensure a firm fit of the upper thread section 19' in the component 30. The penetration of the upper thread section 19' into the through-bore 32' is made easier in this case by the elements 34, which are provided in the transition section 22'.

Figure 3A:
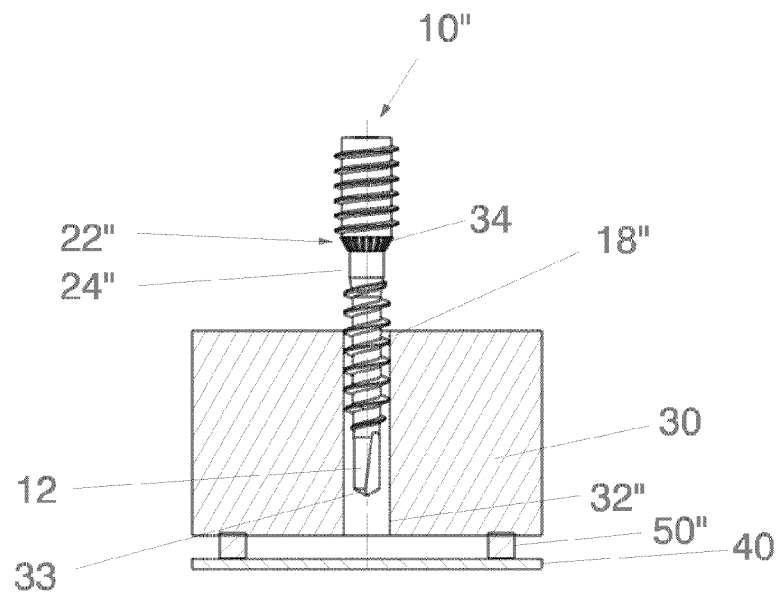
FIGS. 3A-3C show a third embodiment of a according to the invention during different phases in the production of the third embodiment of the connection according to the invention of a component to a substructure.
Figure 3B:
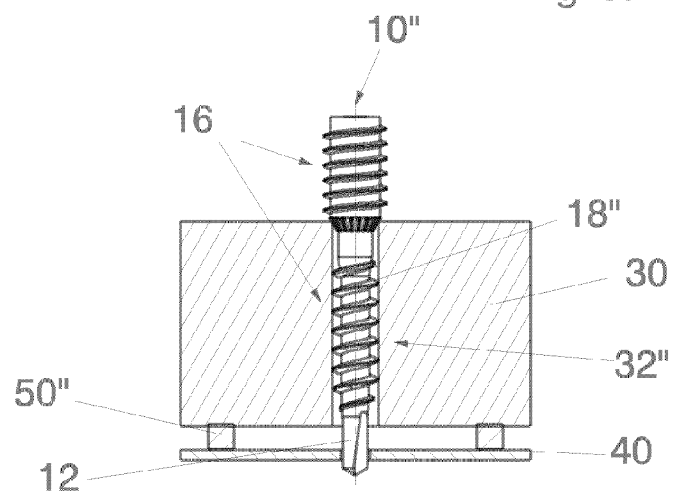
Figure 3C:
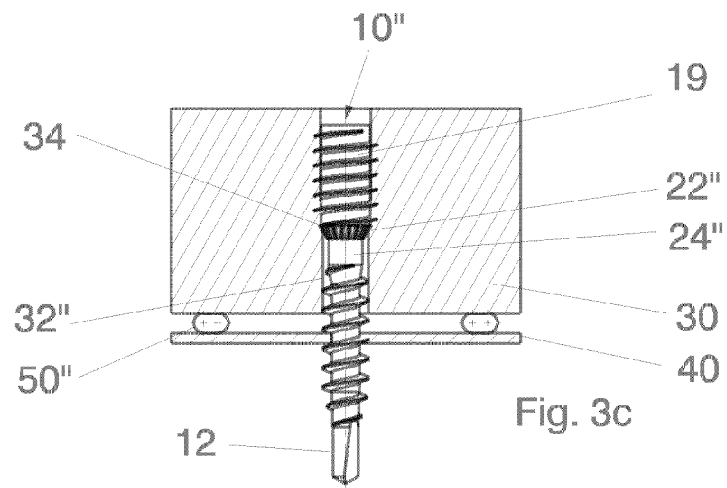

The same considerations apply to the third embodiment of the screw 10" and of the connection according to the invention illustrated in FIGS. 3A-3C. As long as the thread of the lower thread section 18', 18" is not yet in engagement with the substructure 40, the advance of the screw 10" could also be supported here by the engagement of the thread of the lower thread section 18" in the region of the through-bore 32" in the material of the component 30 (not illustrated).

The embodiments according to FIGS. 2A-2C and 3A-3C additionally differ from the embodiment according to FIGS. 1A-1C in that the seal 50 is not configured as a continuous coating or a continuous plate or disk, but as an annular seal 50' and 50", respectively.

The shank 13 is provided, at an end opposite the tip 12, with a head which in this case is a thickened shank section that is provided with the upper thread section 19, 19' or 19". The head is provided with a tool engagement portion 26 which, although shown as an internal tool engagement portion, could instead be an external tool engagement portion. In the case of the first embodiment of the screw 10 according to the invention, shown in FIGS. 1A-1C and 4, the head is configured with a flat disk 27. The disk 27 has an outside diameter which is larger than the thread outside diameter $D_{19}$ of the upper thread section 19.

The thread outside diameters $D_{19}$ and $D_{18}$ of the upper and lower thread sections 19, 19', 19" and 18, 18', 18", respectively, are in a ratio of 1.2 to 1.4. The upper and the lower thread section 19 and 18, respectively, have core diameters $D_{GaK}$ and $D_{GK}$, respectively, which are in a ratio of 1.6 to 1.8 and preferably 1.8.

When the component 30 to be fastened is provided with a through-bore 32, as is the case in the first embodiment of the screw 10 according to the invention, shown in FIGS. 1a-1c, then, as set out above, the bore diameter $D_B$ of the component 30 corresponds at least to the core diameter $D_{GaK}$ of the upper thread section 19 or at least to the core diameter $D_{GK}$ of the thread of the lower thread section 18, 18' of the screw 10, 10'. The thread outside diameter $D_{19}$ of the upper thread section 19, 19' is coordinated with the material properties of the component 30 by way of the thread outside diameter $D_{18}$ of the lower thread section 18, 18'. The screw 10 is intended to be screwed into the component 30 until it rests on the component 30 by way of the flat disk 27 and thus has an abutment which prevents stripping of the screw. Likewise, the thread form of the thread of the upper thread section 19, 19' is coordinated with the material properties of the component 30.

FIGS. 2A-2C show a second embodiment of the connection according to the invention having a screw, which is designated 10' overall. The screw 10' has a tip 12' which is configured as a penetration tip. Furthermore, it has a lower thread section 18' which merges directly, that is to say without an interposed shank section without a thread, into an in this case conically narrowing transition section 22', which is configured with a thread start of an upper thread section 19'. Located between the component 30 and the substructure 40 is the seal 50', which may be annular or may consist of one or more elastic sealing elements which are compressed in a defined manner after the screw has been set. This is shown in FIG. 2C, in which the set state of the screw 10' is illustrated.

In the embodiment illustrated in FIGS. 2A-2C, the component 30, as already mentioned, has the through-bore 32', at least that part of which that is the lower part in the drawing is adapted to the outside diameter of the lower thread section 18'. That part of the through-bore 32' that is the upper part in the drawing could be dimensioned with a somewhat larger diameter than the lower part. This allows the screw to be screwed in until it is countersunk in a flush manner in the component 30, as is shown in FIG. 2C. The step at the transition between the lower bore part and the upper bore part would in this case form an abutment for the head or the larger-diameter part of the screw 10' having the upper thread section 19', in order to prevent stripping of the screw 10' during setting. Furthermore, the lower bore part of the through-bore 32' would then center the screw 10.

The through-bore 32, 32" according to FIGS. 1A-1C or 3A-3C does not necessarily have to be present in the component 30 from the outset, if the screw 10 or 10" is intended to be set. The same purpose as the through-bore 32' or 32" could also be fulfilled by a core hole, which is produced with the diameter $D_{GK}$ by the boring part 12, including an internal thread which is produced by the lower thread section 18 or 18'. In this case, the lower thread section 18 or 18' of the screw 10, 10" should be engagement only with the substructure 40 if the upper thread section 19 of the screw 10, 10" is in engagement with the component 30. This could be achieved in that the length of the shank section 24, 24" without a thread is dimensioned such that the latter extends downwardly right to the upper surface of the substructure 40 when the screw 10, 10" has been set. In this case, in the set state of the screw 10', 10", the upper shank section 19, 19" would be in engagement with the component 30, while therebeneath the shank section 24, 24" without a thread extends up to the point at which, as seen from above, the substructure 40 begins. With the screw 10" set, only the upper thread section 19 is then in engagement with the component 30. The screw 10" could thus be set in a component 30 in which no through-bore 32, 32" is present from the outset.

Figure 4:
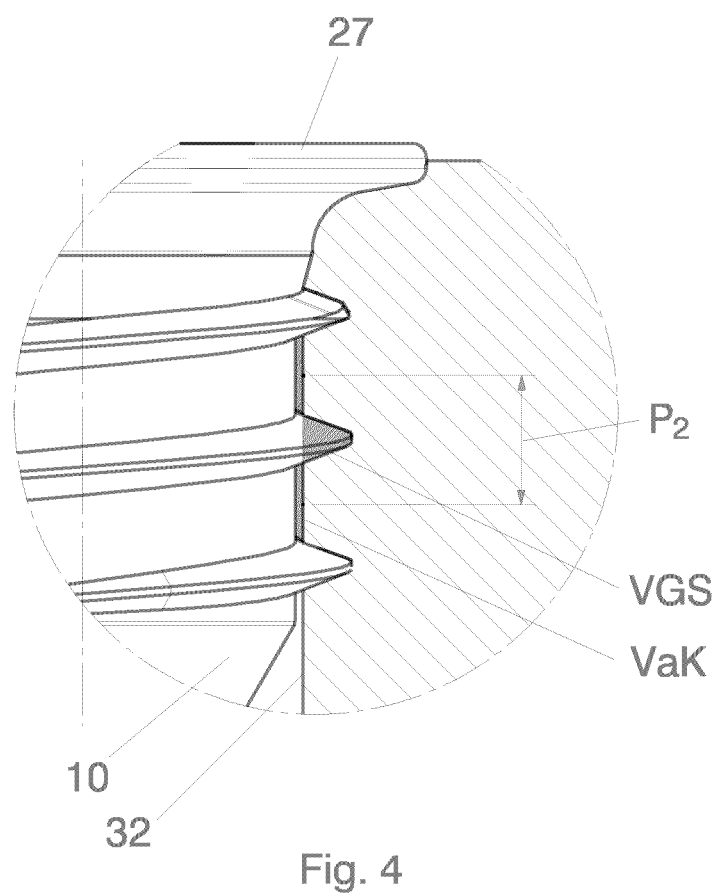
FIG. 4 shows an enlarged illustration of a detail of the connection according to FIG. 1C.

FIG. 4 shows an enlarged illustration of a detail of the screw 10 illustrated in FIGS. 1A-1C in the region of the upper thread section 19. The detail illustrated in an enlarged manner shows that the core diameter $D_{GaK}$, the through-bore 32 in the region of the upper thread section 19 and the thread form of the upper thread section 19 are designed such that a volume $V_{GS}$ displaced by the thread of the upper thread section 19 is pushed into, and thus seals off, the region of a volume $V_{aK}$ between the core diameter $D_{GaK}$ of the upper thread section 19 and the through-bore 32.

LIST OF REFERENCE SIGNS 10, 10', 10" Screw
12, 12' Tip
13 Shank
16 Thread
18, 18', 18" Lower thread section
19, 19', 19" Upper thread section
22, 22', 22" Transition section
24, 24', 24" Shank section without a thread
26 Tool engagement portion
27 Flat disk
30 Component
32, 32', 32" Through-bore
34 Elements
40 Substructure
50, 50', 50" Seal
$D_B$ Diameter
$D_{GK}$ Core diameter
$D_{GaK}$ Core diameter
$D_{18}$ Thread outside diameter
$D_{19}$ Thread outside diameter
$P_1$, $P_2$ Thread pitch
L Length of upper thread section
H Compressed thickness

The invention claimed is:

1. A connection of a substructure (40) by a screw to a plastic component (30) having a through-bore (32, 32') and having a seal (50, 50') located between the substructure (40) and the component (30), the connection comprising a screw (10, 10', 10") having a shank (13) with a thread-cutting or self-tapping thread (16) and with a tip (12, 12'), the substructure is formed from a thin metal sheet, in that the plastic component is produced from a plastic material, the tip (12, 12') is configured as at least one of a boring part or a penetration tip, a lower thread section (18, 18') of the thread adjacent to the tip (12, 12' has a first thread outside diameter ($D_{18}$), an upper thread section (19, 19') of the thread opposite the tip (12, 12') has a second, larger thread outside diameter ($D_{19}$), and a transition section (22, 22', 22") with a continuously changing diameter is located between the two thread sections (18, 19; 18', 19'), wherein the upper thread section (19, 19') has a thread pitch ($P_2$) which is smaller than the thread pitch ($P_1$) of the lower thread section (18, 18'), and the connection is produced by a combination of sealing by defined compression of the seal (50, 60) and sealing by a form fit between the upper thread section (19, 19', 19") of the screw (10, 10', 10") and the component (30) and compaction of the material of the component (30) around the upper thread section (19, 19', 19").

2. The connection as claimed in claim 1, wherein the compression of the seal (50, 50') corresponds to a difference between the thread pitches of the two thread sections (18, 19; 18', 19') multiplied by a number of thread turns of the thread of the upper thread section (19, 19').

3. The connection as claimed in claim 1, wherein the seal (50, 50') is compressed by between 20% and 80%.

4. The connection as claimed in claim 1, wherein a diameter ($D_B$) of the through-bore (32) in the component (30) corresponds at least to a core diameter ($D_{GK}$, $D_{GaK}$) of the thread of the lower thread section (18, 18', 18") or of the upper thread section (19, 19', 19") of the screw (10, 10', 10").

5. The connection as claimed in claim 1, wherein the thread outside diameter (D19) of the upper thread section (19, 19') is coordinated with material properties of the component (30) by way of the thread outside diameter (D18) of the lower thread section (18, 18', 18").

6. The connection as claimed in claim 1, wherein a thread form of the upper thread section (19, 19') is coordinated with material properties of the component (30).

7. The connection as claimed in claim 1, wherein the component (30) is a glass fiber reinforced plastic part.

8. The connection as claimed in claim 1, wherein the seal (50, 50') is attached to the component (30) on a bearing surface with respect to the substructure (40) and around the through-bore (32, 32').

9. The connection as claimed in claim 1, wherein the seal (50, 50') is connected in a sealing manner to the component (30) on one side and to the substructure (40) on the other side.

10. The connection as claimed in claim 1, wherein the connection is used on an outer shell of a building.

11. The connection as claimed in claim 1, wherein the connection is used on a roof of a building.

12. The connection as claimed in claim 1, wherein a core diameter ($D_{GaK}$), the through-bore (32) in a region of the upper thread section (19), and a thread form of the upper thread section (19) are designed such that a volume (V.sub.GS) displaced by the thread of the upper thread section (19) is pushed into, and thus seals off, a region of a volume ($V_{aK}$) between the core diameter ($D_{GaK}$) of the upper thread section (19) and the through-bore (32).

13. The connection as claimed in claim 1, wherein the transition section (22') is configured with a thread start of the upper thread section (19').

14. The connection as claimed in claim 1, wherein the transition section (22) is configured without a thread.

15. The connection as claimed in claim 1, wherein a part of the shank (13) that adjoins the transition section (22, 22") in a direction of the tip (12) is configured as a shank section (24, 24") without a thread.

16. The connection as claimed in claim 1, wherein a thread pitch ($P_1$) of the lower thread section (18, 18') is in a ratio of 1.1 to 1.5 to a thread pitch ($P_2$) of the upper thread section (19, 19').

17. The connection as claimed in claim 1, wherein elements (34) for widening a core hole (33) bored with the tip (12) or for heating a material surrounding the core hole (33) are provided in the transition section (22").

18. The connection as claimed in claim 1, wherein the shank (13) is provided with a head or a tool engagement portion (26) at an end opposite the tip (12).

19. The connection as claimed in claim 18, wherein the head is configured with a flat disk (27).

20. The connection as claimed in claim 1, wherein the thread of the lower thread section (18) is a sheet-metal screw thread.

21. The connection as claimed in claim 1, wherein the thread outside diameters ($D_{19}$, $D_{18}$) of the upper and lower thread sections (19, 18) are in a ratio of 1.2 to 1.4.

22. The connection as claimed in claim 1, wherein the thread sections (19, 18) have core diameters ($D_{GaK}$, $D_{GK}$) which are in a ratio of 1.6 to 1.8.

23. The connection as claimed in claim 1, wherein the transition section (22, 22', 22") is a conically narrowing shank section.

24. The connection as claimed in claim 1, wherein transition section (22, 22', 22") is formed by a chamfer on a cylindrical part, facing the tip (12, 12'), of the upper thread section (19, 19').

\* \* \* \* \*